Dec. 20, 1966 T. E. CROWDER ET AL 3,292,822

SELF-CONTAINED DRINK DISPENSING DEVICE

Filed Sept. 11, 1964 8 Sheets-Sheet 1

INVENTORS
TRYON S. LINDABURY
THOMAS E. CROWDER
BY
Patrick F. Henry
ATTORNEY

Dec. 20, 1966 T. E. CROWDER ET AL 3,292,822

SELF-CONTAINED DRINK DISPENSING DEVICE

Filed Sept. 11, 1964 8 Sheets-Sheet 2

INVENTORS
TRYON S. LINDABURY
THOMAS E. CROWDER
BY
Patrick D. [signature]
ATTORNEY INVENTORS
TRYON S. LINDABURY
THOMAS E. CROWDER
BY Patrick J. Henry
ATTORNEY

SELF-CONTAINED DRINK DISPENSING DEVICE

Filed Sept. 11, 1964 8 Sheets-Sheet 4

INVENTORS
TRYON S. LINDABURY
THOMAS E. CROWDER
BY
Patrick J. Hanley
ATTORNEY

INVENTORS
TRYON S. LINDABURY
THOMAS E. CROWDER
BY
Patrick J. Henry
ATTORNEY

INVENTORS
TRYON S. LINDABURY
THOMAS E. CROWDER
BY
Patrick J. Henry
ATTORNEY

SELF-CONTAINED DRINK DISPENSING DEVICE

Filed Sept. 11, 1964 8 Sheets-Sheet 7

INVENTORS
TRYON S. LINDABURY
THOMAS E. CROWDER
BY Patrick J. Henry
ATTORNEY

SELF-CONTAINED DRINK DISPENSING DEVICE

Filed Sept. 11, 1964

INVENTORS
TRYON S. LINDABURY
THOMAS E. CROWDER
BY
Patrick J. Henry
ATTORNEY 3,292,822

SELF-CONTAINED DRINK DISPENSING DEVICE

Thomas E. Crowder, 1343 La Vista Road, De Kalb County, Ga. 30324, and Tryon S. Lindabury, Tuxedo Road, Marietta, Ga. 30060

Filed Sept. 11, 1964, Ser. No. 395,757
14 Claims. (Cl. 222—129.1)

This invention relates to a self-contained drink dispensing device and particularly to home-type soda fountain arrangement having means for storing and dispensing flavored syrups and the like with carbonated water that is suitably cooled by means of self-contained cooling arrangement.

Most carbonated drink dispensing devices require expensive equipment for the purpose of providing the necessary carbonation to the water and for properly mixing and dispensing the drink. There is a certain advantage and value to the dispensing of carbonated beverages which are prepared in the dispenser by mixing suitably cooled carbonated water with a variety of different syrups. This appeals to many people, particularly children who are able to mix their own carbonated drinks rather than taking one which has already been prepared and bottled. The present invention relates to a less expensive type of carbonated drink dispensing unit which is self-contained and may even be portable but readily provides a choice of mixed-carbonated beverages selected and dispensed by placing a cup on a suitable outlet.

Generally described, without restriction on the scope of my invention as defined in the appended claims, the present self-contained, carbonated beverage dispenser comprises a housing or cabinet which may be in the form of a box with a top that is removable as by swinging away the upper halves of the top still attached to the bottom. This provides an open cabinet for placement of the various sub-components and for servicing and replenishing the contents. Suitably mounted and retained on the bottom of the cabinet inside thereof and at the front is a standard $CO_2$ bottle which may be purchased on the market and that normally is initially charged with nine hundred p.s.i. of contents. Also inside the compartment adjacent the $CO_2$ bottle is a tank of water and a quick disconnecting high pressure line leads through a pressure regulator and gauge assembly to regulate the water to the water tank with suitable disconnect plumbing fittings at the tank. A cooler unit mounted within the cabinet and adjacent the water tank comprises a cooler, insulated housing of cylindrical formation with a removable top and several radially formed compartments inside each accommodating an elongated tube of permanently seal coolant material which are pre-cooled from time to time in a freezer compartment of a refrigerator or the like. Both the water tank and the cooler are pressurized with typically 100 p.s.i. and suitable small plumbing fixtures connect the water tank with the cooling units so that the water may be forced under pressure and mixed with the $CO_2$ and circulated through the baffle arrangement in the cooling compartment. The front of the cabinet supports a removable shelf having several positions thereon with suitable indentations to accommodate cups placed thereon. Above the shelf and supported on the cabinet is a syrup support shelf with suitable locations thereon to accommodate several individual syrup containers which may be sealed plastic bags or cartons with a flexible protrusion thereon from which syrup is dispensed by squeezing same with a clip and handle release device. Mounted above the center of the shelf and supported on the cabinet is an outlet spigot from which the cooled water is dispensed selectively by pushing a conventional pivoted cup control member.

A primary object of this invention is to provide a self-contained drink dispensing apparatus which may be used as a home soda fountain and moved readily from place to place.

An additional object of this invention resides in the particular arrangement in a cooling unit for the drink dispensing apparatus providing cooling capsules or tubes that are initially cooled in a refrigerator or the like and used in the present unit over and over again.

Another object of this invention resides in the manner of supporting individual syrup containers which may be manufactured from inexpensive plastic in the form bags or cartons with a dispensing protrusion whereby the syrup is sealed until used and then is closed off in between dispensing.

Another object of this invention resides in the cabinet design and arrangement for accommodating a $CO_2$ bottle, a water tank and a cooling unit as well as individual syrup dispensers all readily removable and replaceable for replenishment and servicing and in the manner of locating the individual units as well as the opening of the cabinet for servicing and dispensing.

Still another object of this invention resides in the manner of supporting the individual plastic syrup containers for a gravity feed operation from the top in association with a support shelf therebelow for the individual cups all arranged in an inexpensive and convenient manner.

Also an object of this invention is to provide a combination of a compartment or cabinet in which is located an individual $CO_2$ bottle, a water tank and a cooling unit all connected together by inexpensive plumbing so that the various items may readily be replaced or serviced.

Other and further objects, advantages and purposes of this invention as well as applications therefor and the various components will be apparent upon reading the following specification taken in conjunction with the accompanying drawings in which.

For the purposes of this specification and drink dispenser it is to be understood that such things as $CO_2$ gas is a common item which may be purchased on the market and is customarily supplied in $CO_2$ bottles for so-called seltzer bottle use and is mixed with water to make what is known as carbonated water commonly used in soft-drinks. Further, the details of the $CO_2$ bottle insofar as being a pressurized container sufficient 1000 p.s.i. is a feature built into items such as this on the market. Also, drink syrups may be purchased from any number of sources and when mixed with carbonated water make a suitable beverage of the sort which may be dispensed from the present dispenser.

Figure 1:
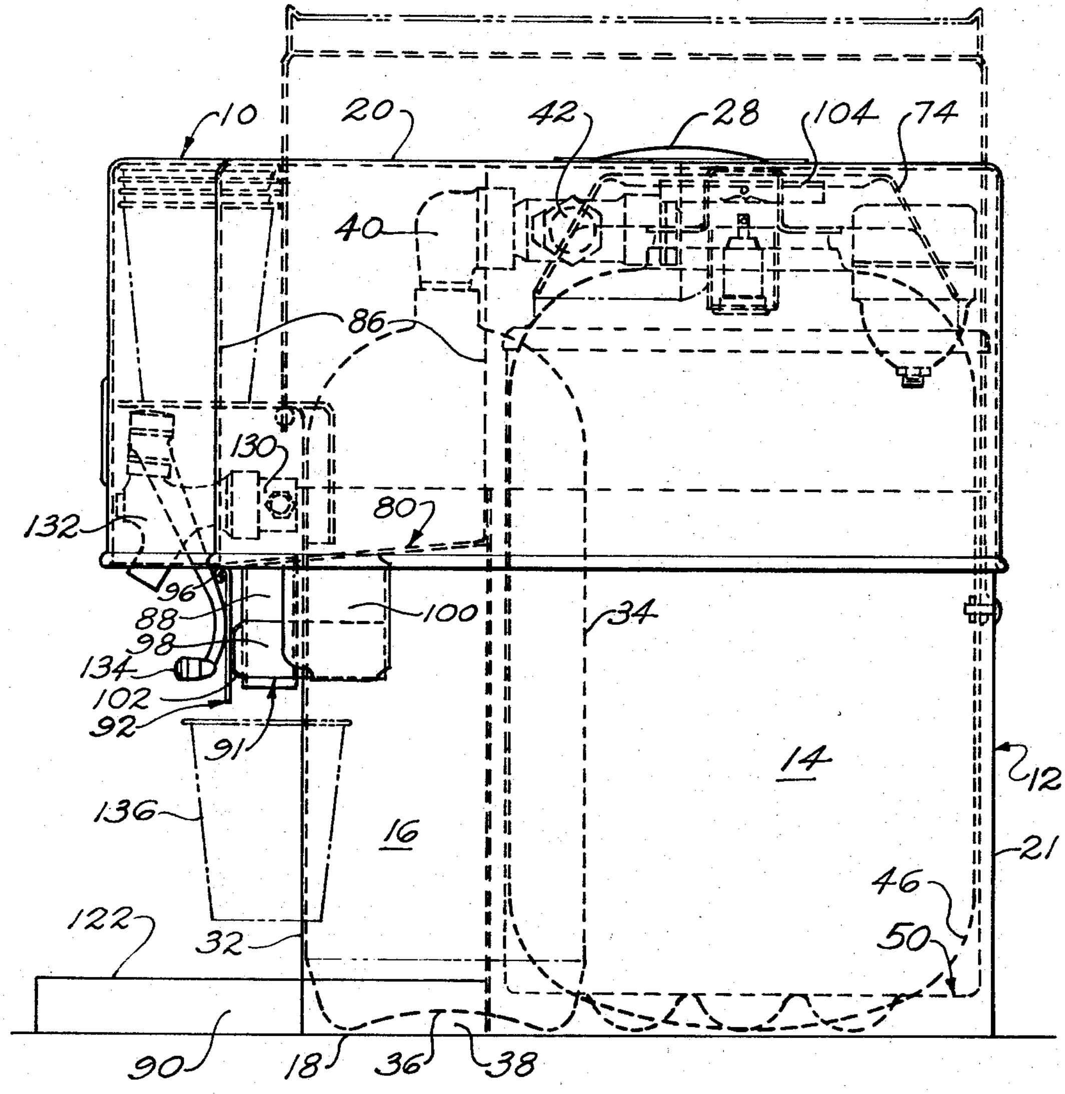
FIG. 1 is a side elevation view of the present invention with the internal components shown in dotted lines.
Figure 2:
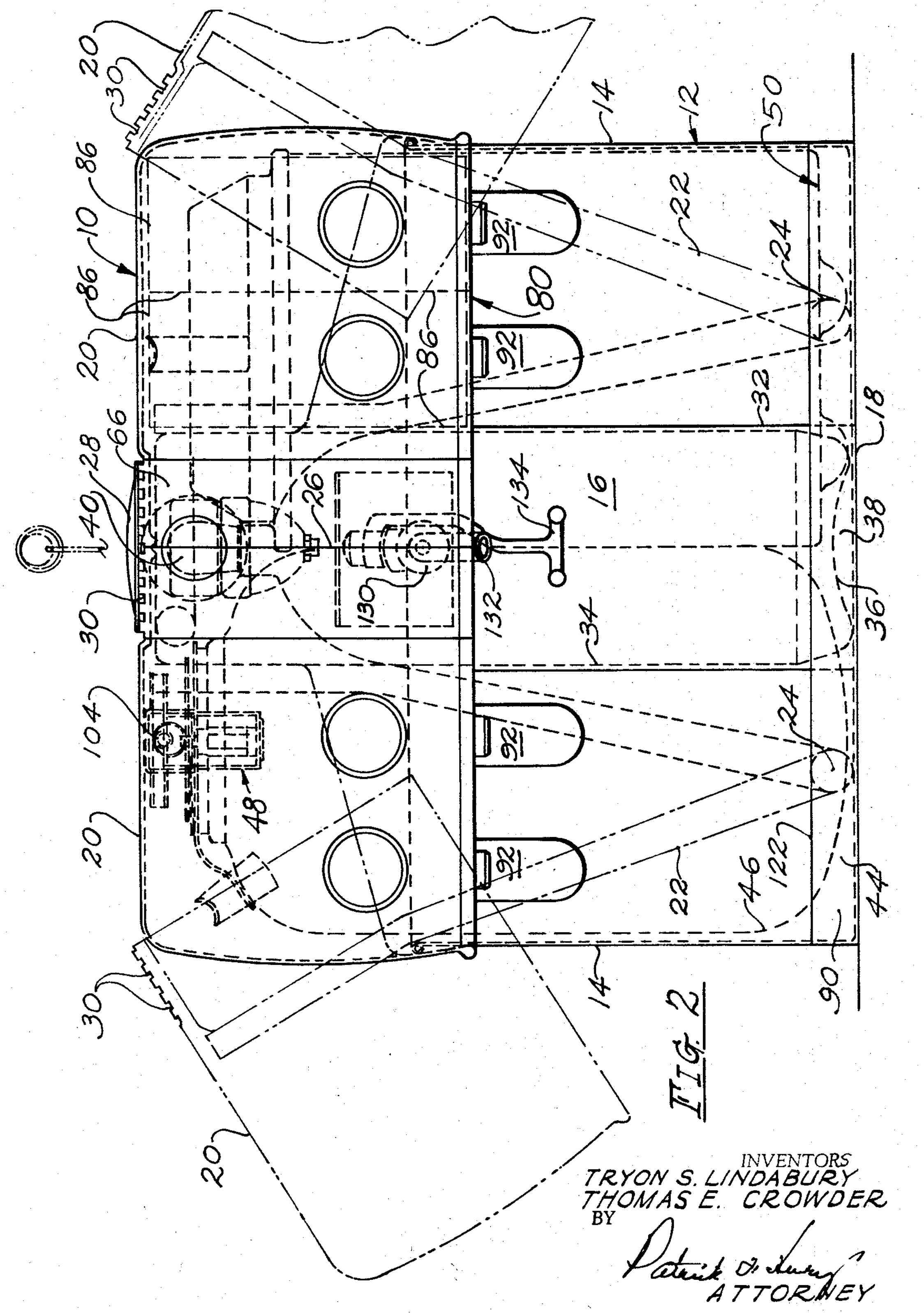
FIG. 2 is a front elevation view of the drink dispenser shown in FIG. 1 and with the internal components shown in dotted lines and also with the two top sections moved into open position as shown in dotted lines.
Figure 3:
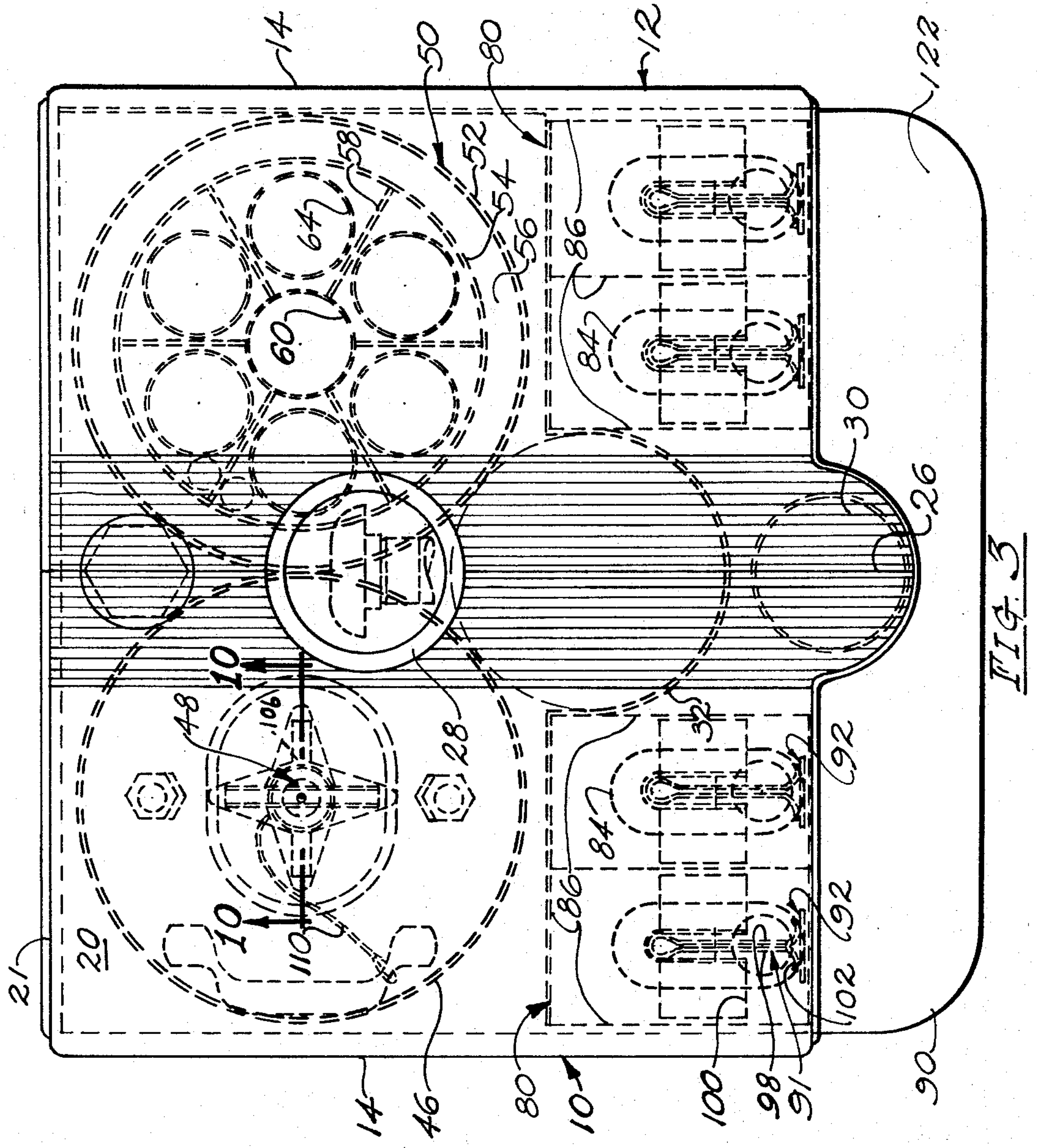
FIG. 3 is a top plan view of the drink dispenser shown in FIGS. 1 and 2.

Referring initially to FIG. 1 and then to FIGS. 2 and 3 as the intial specification unfolds and from there to the other figs. of the drawings, the entire dispensing arrangement is designated by the reference numeral 10 and comprises in its entirety a cabinet member, casing or housing 12 which in the lowermost portion thereof is formed like an open box with sides 14, front 16, bottom 18 and back 21. The top of the cabinet 12 is constructed in two identical sections 20 which are symmetrical about the vertical center line of the cabinet 12 and each is supported on the pivoted arms 22 pivoted on pivots 24 attached to the inside of the cabinet 12. With this arrangement, one entire half of the top on each side swings to the side of the cabinet in the manner shown in FIG. 2 to expose the interior of the cabinet 12. The two sides 20 meet along a joining line 26 and are closed and fastened in place on the top by means of an ornamental medallion fastener 28 which clips into serrations 30.

Positioned within the cabinet 12 inside of a contoured front curved surface 32, is a conventional $CO_2$ bottle 34 with a curved bottom 36 fitting on a contoured bottom 38 formed on the bottom of the inside of cabinet 12. The top of the $CO_2$ bottle is provided with a screw fitting 40 of right angular construction, such being common plumbing equipment and being threadily engaged with a cut-off valve 42 and pressure regulator all contained within the compartment 12 inside of the moveable tops 20.

Located on a contoured bottom portion 44 in the cabinet 12 is a water tank 46 primarily of cylindrical construction and having a top closed by a special cap and fitting 48 to be described later on. It suffices to say at the moment that the fitting arrangement 48 may be opened and the water tank replenished. In addition, in association and conjunction with fitting 48, there is suitable means for assuring the tank 46 being properly sealed.

Figures 7, 8:
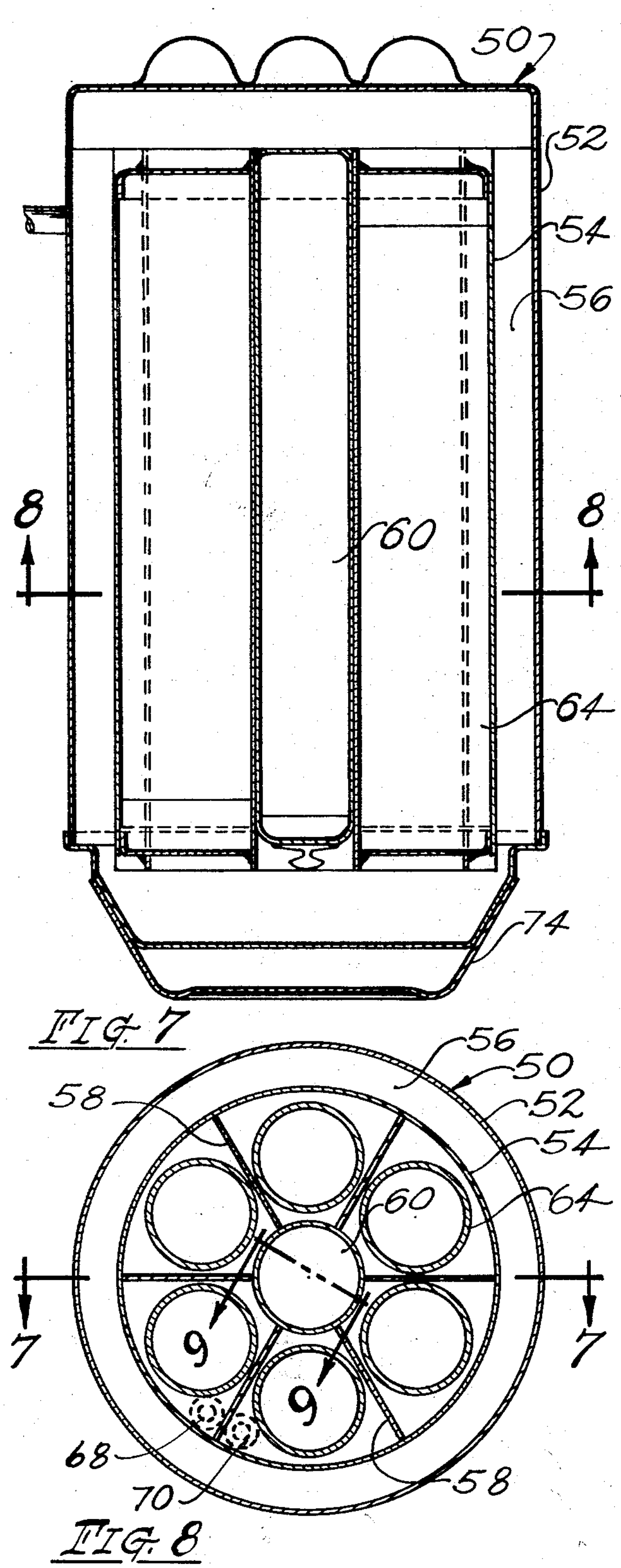
FIG. 7 is a cross-sectional view taken along lines 7—7 in FIG. 8 showing the internal details of the cooling unit.
FIG. 8 is a cross-sectional view taken substantially along lines 8—8 in FIG. 7.
Figure 13:
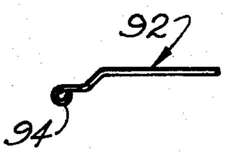
FIG. 13 is a side elevation view of the actuating member for the drink dispensing clip valve.

On the side of the cabinet opposite from the water tank 46 there is located a cylindrical cooling unit 50 in the form of a double walled container having an outer cylindrical wall 52 of metal or the like and inner wall 54 of metal or suitable material both separated by an insulating material 56. By means of radially extending walls 58, therebeing six in the present embodiment, radiating from a central tube 60, the cooling unit 50 is divided into seven individual, cylindrical compartments (including the center compartment 60) into which may be placed and removed individual capsules or cylinders or tubes 62 containing a coolant of any suitable chemical substance for this purpose. These items are known as eutectics and consist of sealed containers with a chemical or fluid inside which may be cooled or frozen and repeated time and time again after the temperature has been increased through the heat exchange. The details of the cooling unit 50 will also appear in FIGS. 7, 8 and 9. It is to be noted that FIG. 7 is inverted from its usual position in the cabinet 12. The individual capsules may be installed and removed from the compartments between the baffles 58 in the cooling unit 50 and since they contain mostly water need never be re-filled and then at the factory or place where originally manufactured. Each space between the baffles 58 is provided with a sleeve 64 in which the capsules 62 may be positioned in close fitting arrangement so as to isolate the capsules 62 from the tank pressure but at the same time acting to conduct heat. Sleeves 64 are integral with the tank 50 and may be considered somewhat like boiler tubes. The entire cooling unit 50 is a cooler pressure vessel which may be made from welded stainless steel providing a lifetime of corrosion proof use. Any pressure which is exerted on the baffles 58 is supported by the tubes 64. By means of plumbing connections and tubes 66, the cooling unit is connected with the $CO_2$ water or carbonated water and each of the spaces between the baffles 58 is a circulating chamber. However, the baffles 58 are not all the same height, some being full length and some being less and therebeing an entrance port 68 for the carbonated water to enter the individual chambers and an exit or discharge port 70 located adjacent to the entry port on the bottom surface of the cooler 50 but separated by the full length baffle which is welded to the top and bottom of the cooling unit 50. The five other baffles are positioned in high and low relationship and looking at the section through the cooler in both FIGS. 3 and 8 it is apparent that the tubes 64 and the tank walls 52, 54 appear circular and there are six pie shaped compartments between the baffles 58. These pie shaped compartments or cooler cells permit upflow in three sections that are spaced 120 degrees apart and downflow in the alternative sections between the upflow sections. This means that the carbonated water must pass the length of the pie shaped passage a total of six times giving an approximate flow of six times that length.

A removeable, insulated lid 74 permits opening of the cooling unit 50 so that the individual units 62 may be removed and replaced. Each eutectic capsule 62 is a closed welded or otherwise sealed metal or similar material tube or capsule filled with the eutectic material and closed by means of a button cap 76 which also serves to provide a lifting button 76 by which the tubes 66 may be inserted and removed. Cap 76 is screwed in place in the body of the capsule 62 and sealed by O-ring seals 78 and this is normally formed at the factory whenever it is necessary to refurbish or replenish the eutectic.

SYRUP STORAGE AND DISCHARGE

Figure 5:
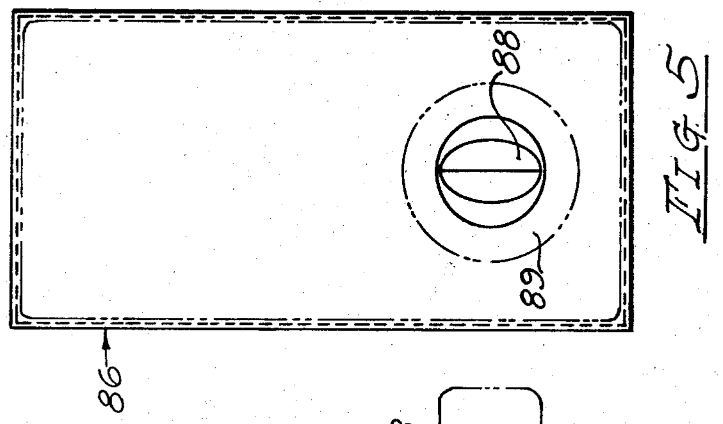
FIG. 5 is a front end elevation view of the syrup container shown in FIG. 4.
Figure 4:
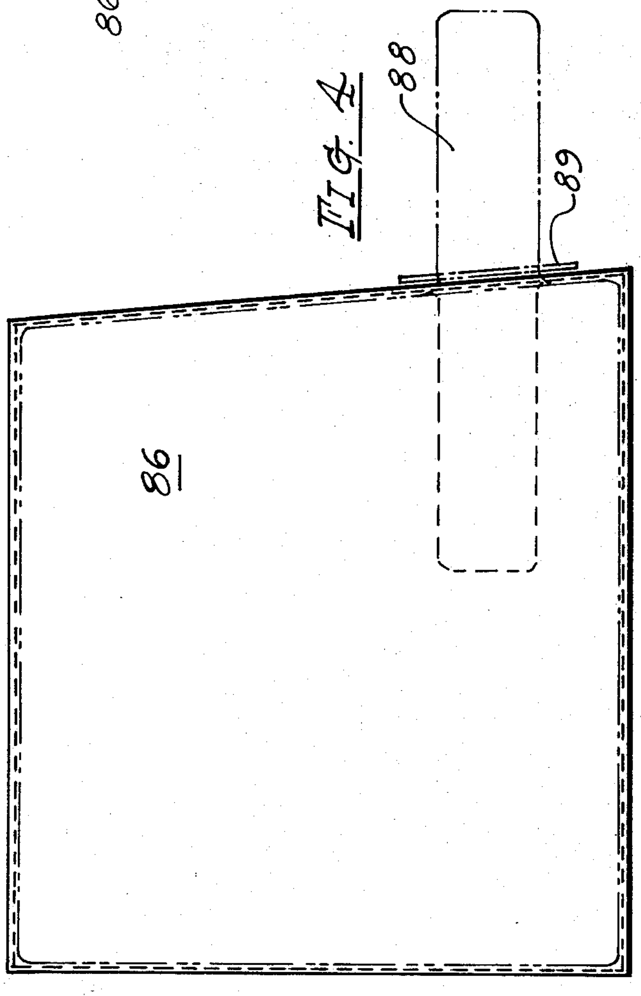
FIG. 4 is a side elevation view of a plastic syrup container used with the dispenser shown in FIG. 1.
Figure 6:
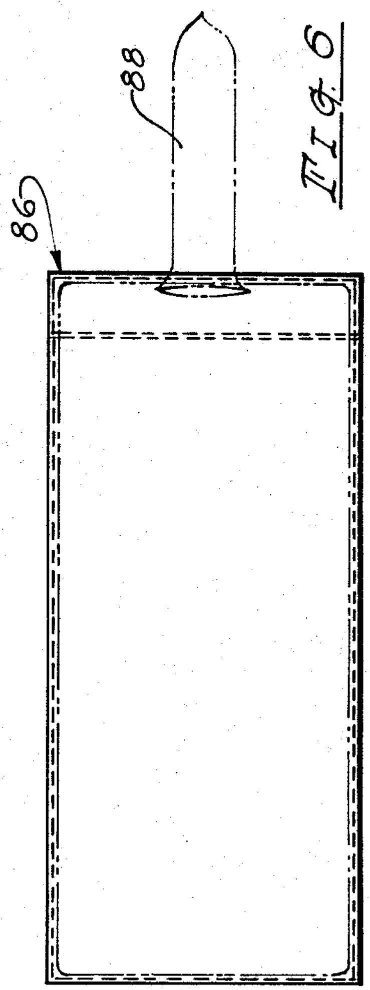
FIG. 6 is a top plan view of the syrup container shown in FIG. 4.
Figure 14:
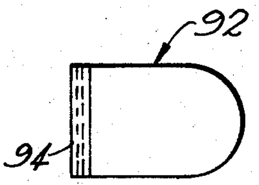
FIG. 14 is a top plan view of the actuating member shown in FIG. 13.
Figure 15:
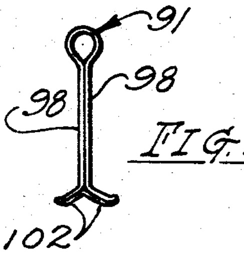
FIG. 15 is a top plan view of a syrup container closure clip.
Figure 16:
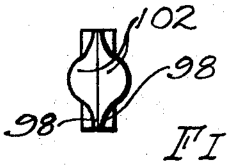
FIG. 16 is a front end elevation view of the clip shown in FIG. 15.

The syrup storage and discharge of the present invention is very novel and worthwhile. In FIGS. 1 through 3, inclusive, it may be seen that a shelf 80 with a downturned flange 82 is supported on the front of the cabinet 12 and has four openings 84 therein to accommodate the syrup containers and the dispensing portion thereof. Referring temporarily to FIGS. 4 through 6, inclusive, the syrup containers and dispensers 86 are adapted to be both the shipping container filled with the syrup at the syrup plant and storage containers until used as well as dispensing containers when in place on the compartment cabinet 12. Each container 86 is adapted to be manufactured from plastic film or similar material or plastic sheets to form a closed container or bag-like container in which the syrup has been poured at the syrup plant. Protruding from and in communication with the inside of the container 86 is a syrup dispensing tube 88 of flexible plastic or the like reinforced by collar member 89 and normally sealed until placed in use on the shelf 80 at which time the plastic tube 88 is cut or opened for use. Stainless steel clips 91 shown in FIGS. 15 and 16 are placed over the tubes 88 after they have been opened and hold the syrup from leaking therefrom until dispensing is performed. Each syrup container 86—and there are four in the present embodiment—is positioned on the shelf 80 with the syrup dispensing tube 88 protruding the opening 84 and extending down above the bottom shelf 90 on the cabinet 12. A pivoted lever 92 shown in FIG. 14 having a pivot portion 94 and being constructed from stainless steel or the like is pivotly mounted in the manner shown in FIGS. 1 and 2 by a pin 96 on the underside of the shelf 80. Each lever 92 operates a spreading mechanism 95 consisting of a U-shaped spreading lever 92 which is positioned between the two clamped legs 98 of the clamping member 91 that hold the tube 88 sealed.

The flexible tubes 88 may also be called spouts or dispensing members and in position are normally closed or pinched off by the clamp clips 91 but may be opened as by cutting with scissors. When the container 86 is lowered in place through the openings 84 the clamp or clip 91 is guided into operating position by a channel-shaped metal guide 100 attached to the cabinet shelf 80. Guide 100 serves as a stop for the clip 91 when the clip 91 is spread by the pivoted thumb lever plate 92. It is to be noticed that the thumb lever plate 92 press against the front lips 102 of the pin 91 and spread the legs 98 to release the syrup from the spout 88.

WATER TANK LID

Figures 9, 10:
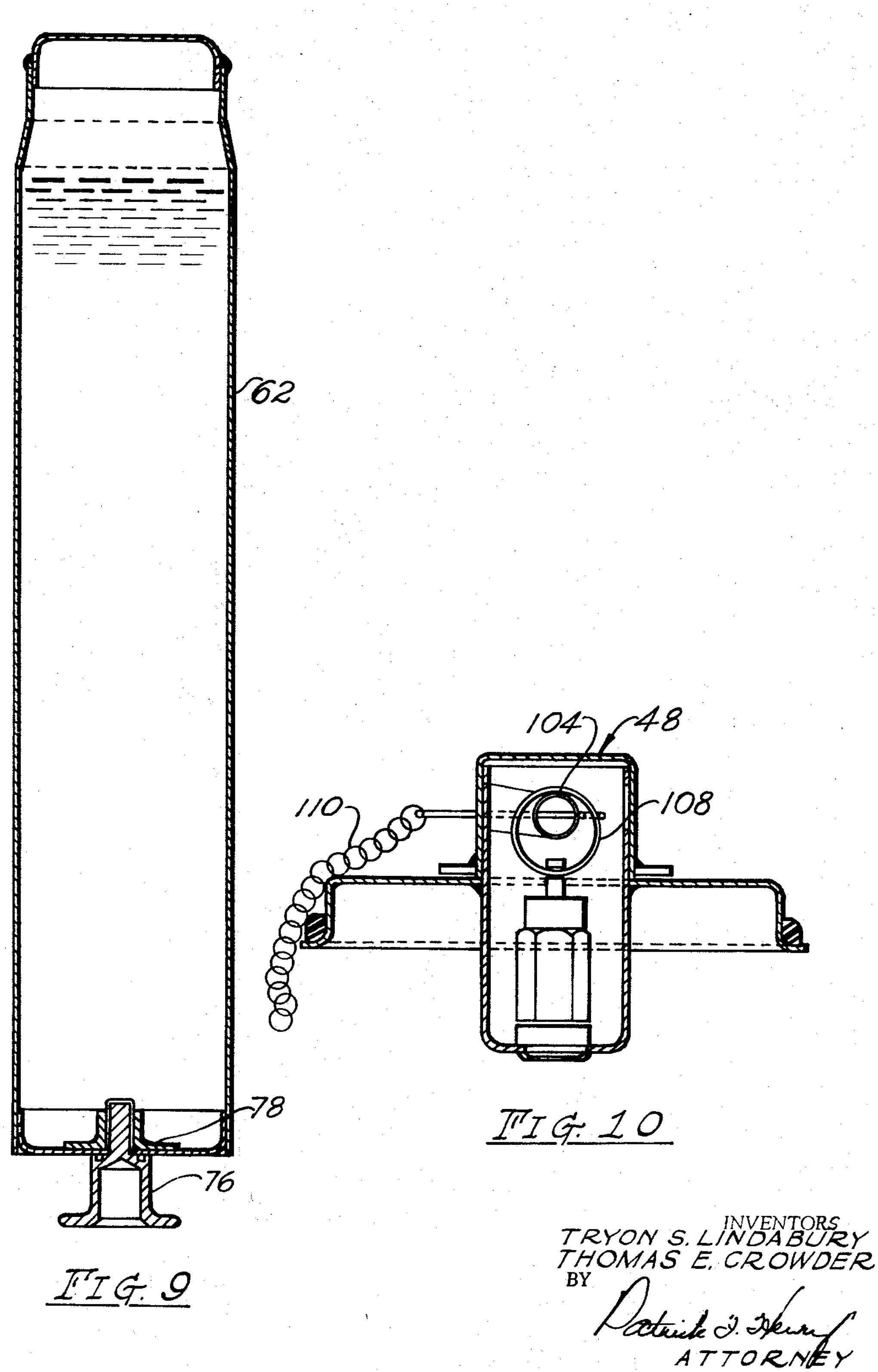
FIG. 9 is a cross-sectional view taken along lines 9—9 in FIG. 8 showing the internal details of one of the individual coolant capsules or cylinders.
FIG. 10 is a cross-sectional view taken along line 10—10 in FIG. 3 of the top for the water tank.
Figure 11:
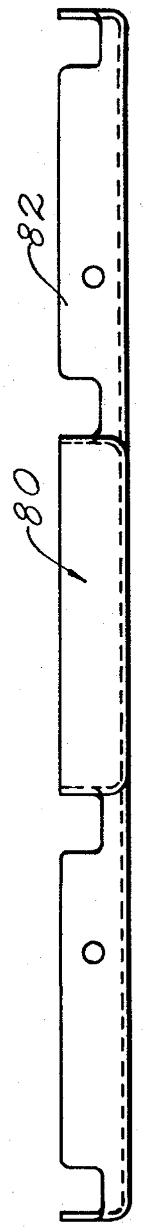
FIG. 11 is a front elevation view of the support shelf for the syrup dispensers.
Figure 12:
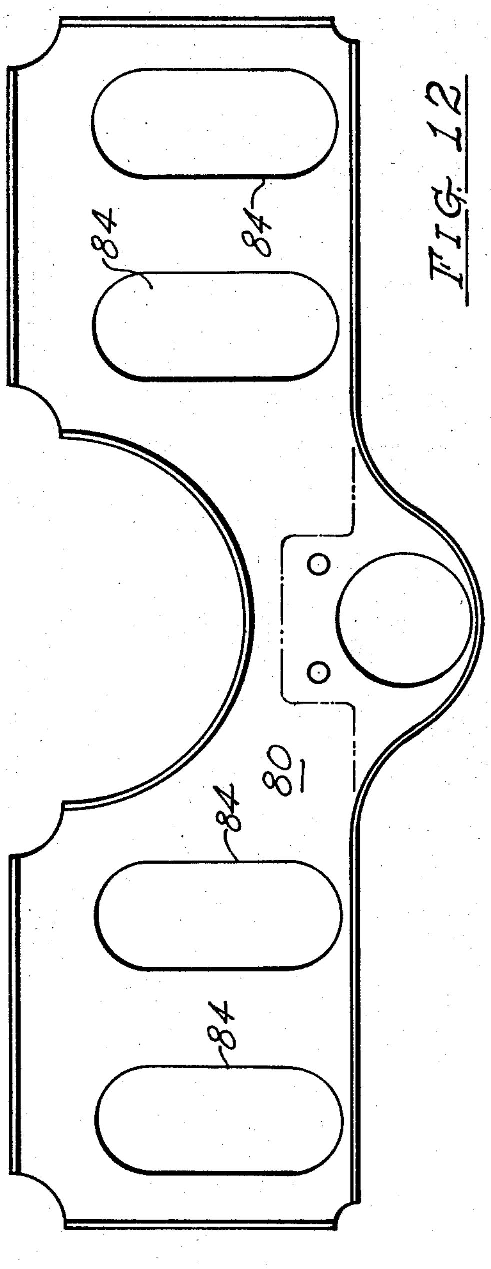
FIG. 12 is a top plan view of the shelf shown in FIG. 11.

Referring especially to FIG. 10 of the drawings, it is readily seen that the top lid 48 for the water tank 46 includes a T-handle 104 fitting in a slotted ramp 106 formed in the top of the tank 46. Lid 48 is rotated 90 degrees and in doing so pulls up on a pressure relief valve ring 108 which automatically releases the tank valve pressure when the tank is opened. After rotating the handle 104 and releasing the lid tank pressure is released and after rotating the handle 104 the lid 48 will fall inside the tank 46 and it is caught by a chain 110 which may be used to pull the entire lid assembly up and out.

Ring 108 pulls on a valve stem 112 in a sealed valve 111 on top of the tank 46. Normally this is prevented by the locking of handle 104 in the gasket of ramp 106. This is a safety feature which prevents someone from opening the tank 46 too fast and having the lid blow-off under pressure.

TRAY 90

The tray 90 is mounted in a three point suspension arrangement. Two of the points are in the form of tapered pins 120 which also serve as lid hinge pins. The third point is a common type of Deutsch fastener which is a quick lock fitting that requires only a push to unlock and a push to lock. Tray 90 is thus installed and may be removed with one hand only. A sheet metal grillwork 122 covers the tray pan 90 and is flush with the flat portion adjoining the cabinet 12.

An auxiliary pressure line 126 leads from the $CO_2$ bottle 16 to the cooling container 50 through a suitable pressure regulator 128. This auxiliary $CO_2$ line 126 leads into the interior of container 50 and pressurizes it with $CO_2$ independently of the water tank 14 and the usual $CO_2$ water lines 66 extending from the tank 14. One primary purpose of this auxiliary line 126 is to assure carbonated water at all times even when the unit has been idle for some period of time. It tends to retard the formation of "flat" water which has been sitting under changing conditions.

REFRIGERATOR MODEL

Figures 17, 18:
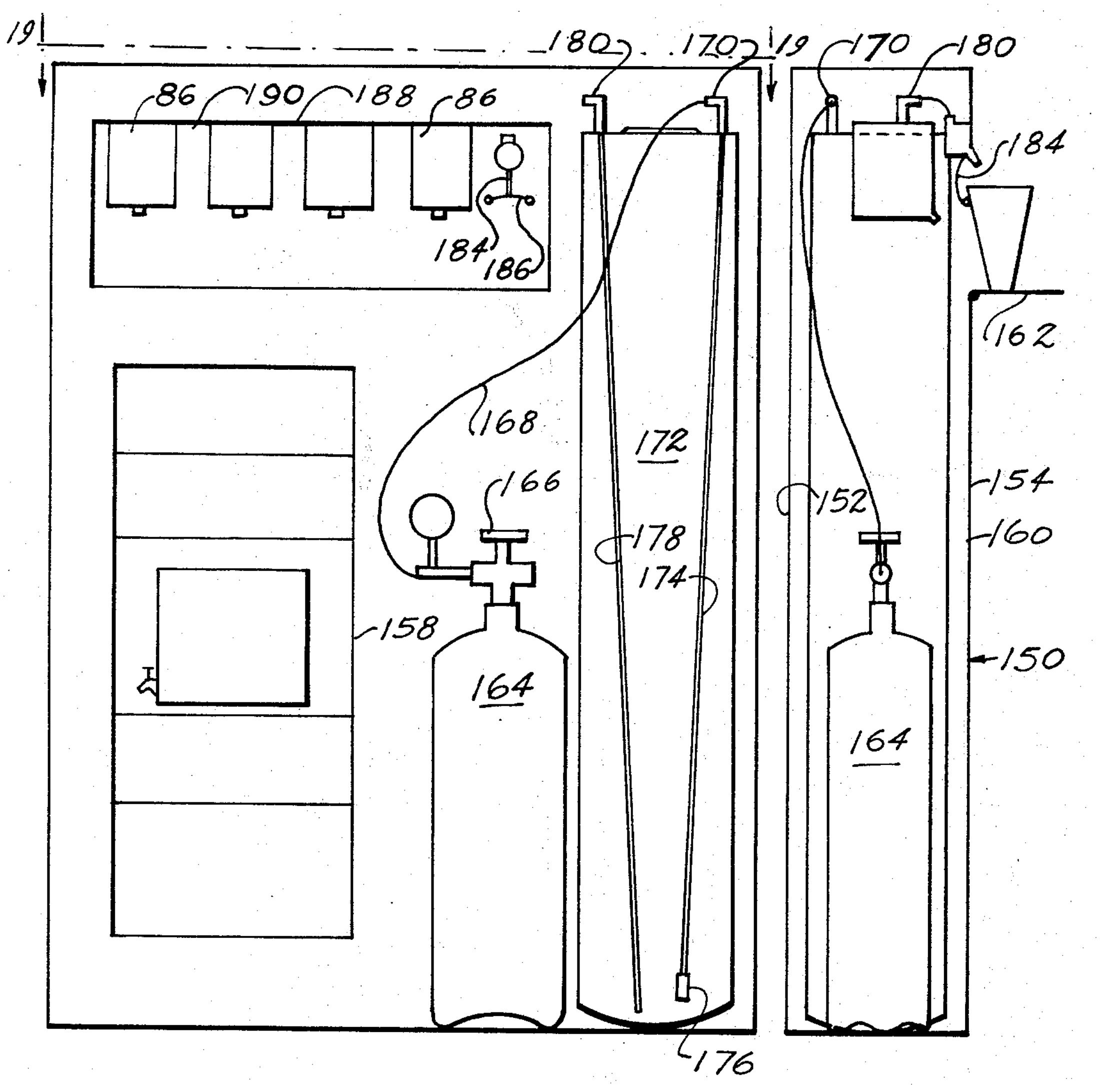
FIG. 17 is a diagrmmatic view of a modified form of the present invention shown installed in a conventional refrigerator door.
FIG. 18 is a cross-sectional diagrammatic view taken along the lines 18—18 in FIG. 17.
Figure 19:
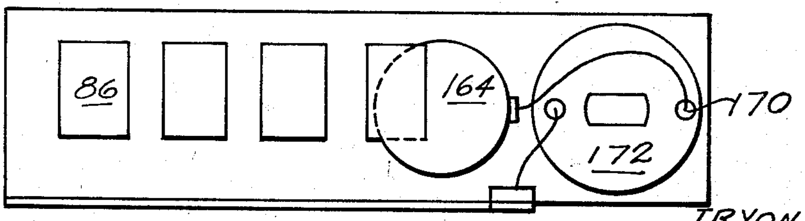
FIG. 19 is a diagrammatic cross-sectional view taken along the lines 19—19 in FIG. 17.

In FIGS. 17 and 18 there is shown a modified form of the present invention which may be applied to a conventional refrigerator door 150 which essentially takes the place of and acts the same as the portable cabinet 12 in the present invention. The refrigerator door 50 is of conventional overall construction with an outside panel 152 and an inside panel 154 suitably connected together by space arrangement 156 and provided in portions with compartments 158 for eggs, butter and the like and inbetween compartments may be provided with suitable foam plastic insulation or other insulating material. A separate compartment arrangement 160 is provided in the refrigerator door 150 by means of a hinged door 162. Removably placed in this compartment is a conventional $CO_2$ bottle 164 connected by suitable pressure regulator mechanism 166 through a flexible line 168 with the inlet 170 of a water tank 172 that is removably positioned inside compartment 160. Water tank 172 has an inner tube 174 leading down into the bottom of the water tank provided with an outlet ceramic diffuser 176 opening to the bottom of the tank. An outlet tube 178 is connected in a sealed relation with an outlet fitting 180 having a flexible tube 182 thereon leading to a conventional push type beverage valve 184 that is actuated by pushing a cup against a member 186 thereon. In a compartment 188 there is mounted a beverage syrup support shelf arrangement 190 supporting individual syrup dispensing containers 86 of the sort described previously. Containers 86 are supported on a shelf 190.

The carbonated water is delivered through an outlet pipe 130 connected with a conventional spigot 132 having the usual container push type lever 134 which actuates the valve when pushed by a cup 136. The outlet pipe 130 leads from the outlet 70 on the cooling container unit 50.

It is to be noted that the spout or tube 88 on container 86, being flexible, can be inverted on a shelf and pushed into the opening 89 where it joins the main body of the container 86. This is shown in FIG. 5. Normally in shipping, the tube 88 would be collapsed and inserted inside container 86. Furthermore, if desired, collar 90 can be a sealed plastic cap which can be ripped or torn away at the time the tube 88 is extended.

Container 86, although adapted to be made from plastic, can be made from any combination of material, such as cartonboard combined with plastic or from laminated sheet material such as plastic covered or coated sheet. The outside container can be a paperboard or cartonboard while the inside can be either a laminated interior (waterproof) or can be a bag of polyethylene or the like inside the outside container. On the other hand, the entire container 86 and spout 88 can be made from plastic, either flexible or hard and either film or molded.

While we have shown and described a particular form of my soda fountain, this is for purpose of showing one skilled in the art one way of constructing the device, and since this may be changed altered, or revised and since many variations, modifications, eliminations and deviations may be made in the disclosed embodiment, this does not constitute any sort of limitation on the scope of our invention as claimed in the appended claims.

We claim:

1. In a drink dispensing device, in combination:
(a) a portable cabinet,
(b) means for supporting cup containers and the like thereon to receive a liquid dispensed from said dispensing device,
(c) a removable $CO_2$ bottle positioned within said cabinet and normally being charged with $CO_2$ gas under pressure,
(d) a removable water container mounted in said cabinet adjacent to said $CO_2$ bottle and being connected removably to said $CO_2$ bottle by fluid conduit means,
(e) a cooling container mounted within said cabinet adjacent to said $CO_2$ bottle and said water tank and having cooling means therein,
(f) said cooling container being connected by fluid conduit means with said $CO_2$ tank and with said water tank and receiving fresh water under pressure and $CO_2$ gas respectfully therefrom, and there being an entrance and a exit in said cooling container for circulating the water,
(g) a water outlet on said cabinet leading from said cooling container and said outlet having a valve means thereon for dispensing water, (h) a syrup support on said cabinet positioned above said support shelf for cups and said syrup support shelf having a plurality of syrup dispensing positions thereon, (i) individual and removable syrup containers each having a syrup dispensing outlet, (j) and syrup control means for each of said syrup containers comprising a valve means operable to release syrup to dispense a measured quantity of syrup in response to a manual actuation.

2. The device in claim 1 wherein said valve control means for said syrup dispensers comprises a pressure closure member fitted on said container and normally closing same in closed condition, and a (a) releasing member with said closure means and being operable to open said closure means to temporarily release fluid from said container and said member being manually engaged to operate said closure means.

3. In a drink dispensing device in combination:

(a) a portable cabinet, (b) a bottom on said cabinet having a removable shelf extending therefrom for supporting cup containers and the like thereon to receive a liquid dispensed from said dispensing device, (c) a removable $CO_2$ bottle positioned within said cabinet and normally being charged with $CO_2$ gas under pressure, (d) a removable water container mounted in said cabinet adjacent to said $CO_2$ bottle and being connected removably to said $CO_2$ bottle by fluid conduit means including a valve and a pressure regulator, (e) a cooling container mounted within said cabinet adjacent to said $CO_2$ bottle and said water tank and having removable eutectic means therein which may be removed and cooled in a refrigerator and returned to said cooling container, (f) said cooling container being connected by fluid conduit means with said $CO_2$ tank and with said water tank and receiving fresh water under pressure and $CO_2$ gas respectfully therefrom, and there being an entrance and a exit in said cooling container for circulating said carbonated water mixture through said eutectic means, (g) an outlet fluid conduit on said cabinet leading from said cooling container and said outlet having a valve means thereon, (h) a syrup support shelf on the front of said cabinet positioned above said support shelf for cups and said syrup support shelf having a plurality of syrup dispensing position thereon, (i) removable syrup containers each being a closed container made from sealed plastic or the like and having a syrup dispensing member formed therewith and being of flexible construction whereby said member may be clamped closed, (j) and syrup control means for each of said syrup dispensing containers comprising a valve means normally closing said dispensing member and being operable to release same to dispense a measured quantity of syrup in response to an actuation manually.

4. The device in claim 3 wherein said valve control means for said syrup dispensers comprises a pressure closure clamp member fitted on said member and normally pinching same in closed condition, and a (a) manually operable member with said closure means and being operable to open said closure means to temporarily release fluid from said protrusion, and said member being manually engaged to operate said closure means.

5. In a drink dispensing device having in a cabinet a means for delivering carbonated water combined with a means for selectively delivering syrup to be mixed with said carbonated water, the combination including a:

(a) cooling means mounted in the cabinet in association with said means for delivering carbonated water, said cooling means comprising a normally closed container having a removable top, (b) said cooling container being divided into a plurality of individual cooling compartments having water circulated therein, (c) a removable cold storage means for each of said compartments in said cooling unit and each of said removable cold storage means being removable for refrigeration in a cold source for the purpose of retaining the cold temperature to transfer same to the water circulating in said cooling means, (d) and there being an exit on said cooling means from which said cooled water is delivered to be mixed with the syrup.

6. The device claimed in claim 5 wherein each of said cold storage means is a closed capsule having a removable top through which is deposited a cold storage solution and from which said solution may be removed and replaced.

7. The device claimed in claim 6 wherein each of said cold storage means is a cylindrical tube having the removable closure formed as a protruding member which may be grasped for removing the tube from the cooling container.

8. The device in claim 7 wherein said container is cylindrical and the compartments are formed by radial baffles extending from a central compartment.

9. The device in claim 8 wherein there are water inlets near the bottom of said baffles and water outlets spaced there above, and said water circulates around said cooling means in each compartment prior to leaving the cooling container.

10. In a combination with a self-contained drink dispensing apparatus which includes a cabinet in which there is a source of carbonated water delivered through a conduit to a cooling chamber which cools the carbonated water, and there being a means for selectively delivering a selected syrup for mixing in a cup with said cooled carbonated water, and said apparatus including a support means for supporting different syrups on the container, the combination including:

(a) a pre-packaged syrup container which has one of a plurality of different choices of flavored syrups therein, (b) said container being manufactured from plastic and the like in the form of a closed container having a closable filling means thereon and having a closed outlet thereon, (c) said outlet having a spout extending therefrom in sealed relationship thereon and said spout being made of a flexible material, (d) a closure means in association with said spout and said spout being inserted on itself into the inside of said container for shipping and said closure means sealing said spout on said container.

11. The device in claim 10, said spout being removable from its retracted position to an extended position on said container for protruding on the dispensing apparatus whereby said spout may be permanently opened as by cutting same open and thereafter temporarily closed on the dispensing apparatus for selectively dispensing a syrup therefrom.

12. In a self-contained drink dispensing apparatus which includes in a cabinet a removable $CO_2$ bottle, a water tank in communication with said $CO_2$ bottle and a cooling means through which said water is circulated for cooling same and being in communication under pressure with said carbonated water, and an outlet for said cooled carbonated water on said apparatus, the combination:

(a) said cabinet having a bottom portion constructed from sheet metal or the like with a closed bottom, sides and an open top, (b) top closure members of substantially identical construction and each occupying approximately one half of the top of said cabinet and being movably mounted on said bottom portion of said cabinet to be separated thereon for opening said top and to be closed along substantially a vertical, central line on said cabinet for closing the top of said cabinet, (c) the bottom of said cabinet being contoured to correspond with the bottom of said water tank in one position and to correspond with the bottom of said $CO_2$ bottle in another, (d) a shelf located near the bottom of said cabinet and being supported thereon and extending therefrom for supporting a cup or the like, (e) a syrup support shelf located on said cabinet and above said bottom shelf for supporting a plurality of syrup dispensers, (f) said syrup support shelf having a plurality of openings therein, a plurality of individual syrup containers each mounted on said shelf and having a spout protruding through the respective opening therein, (g) a closure member closing said syrup dispensing spout on said syrup container, and (h) a lever located on said cabinet and engaging said closure member for temporarily opening said spout to dispense syrup therefrom.

13. In a dispensing arrangement for dispensing syrup and the like on a self-contained drink dispensing apparatus which includes a cabinet having cooled water provided thereon through a selective valve means, in combination therewith:

(a) a syrup container support shelf fastened on said cabinet, (b) a plurality of openings in said shelf each corresponding with a respective, individual syrup container, (c) a replaceable syrup container resting upon said shelf at each opening and each of said containers having an individual spout thereon, (d) each spout on said syrup container being flexible in construction and being closed by a (e) manually operable pressure closure member on said cabinet squeezing said flexible spout closed, (f) a support means located on said shelf for supporting said closure member, and (g) a syrup dispensing lever pivotly mounted on said shelf adjacent each of one of the respective closure members and being located to be brought into engagement therewith upon manual operation thereof whereby said closure member may be temporarily and manually opened to release said spout and thereby permit a selected quantity of syrup to dispense therefrom.

14. The device in claim 13 wherein said closure member is a U-shaped member having a front contact portion, and said lever bears against said U-shaped member to spread same to open position for dispensing syrup.

References Cited by the Examiner

UNITED STATES PATENTS

| | | | |
|---|---|---|---|
| 118,876 | 9/1871 | Meyer | 222—146 X |
| 3,178,061 | 4/1965 | Giacalone et al. | 222—146 X |
| 3,180,529 | 4/1965 | Buffington | 222—131 |
| 3,185,348 | 5/1965 | Pollack et al. | 222—146 X |

ROBERT B. REEVES, *Primary Examiner.*

HADD S. LANE, *Examiner.*